United States Patent
Yang et al.

(10) Patent No.: US 10,595,170 B2
(45) Date of Patent: Mar. 17, 2020

(54) ENHANCEMENT OF MT SM DELIVERY FOR EDRX ENABLED MOBILE TERMINALS

(71) Applicant: Telefonaktiebolaget LM Ericsson (publ), Stockholm (SE)

(72) Inventors: Yong Yang, Kållered (SE); Qian Chen, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/771,054

(22) PCT Filed: Nov. 16, 2016

(86) PCT No.: PCT/EP2016/077871
§ 371 (c)(1),
(2) Date: Apr. 25, 2018

(87) PCT Pub. No.: WO2017/093021
PCT Pub. Date: Jun. 8, 2017

(65) Prior Publication Data
US 2018/0310143 A1    Oct. 25, 2018

Related U.S. Application Data

(60) Provisional application No. 62/262,006, filed on Dec. 2, 2015.

(51) Int. Cl.
*H04W 4/14* (2009.01)
*H04W 76/28* (2018.01)
(Continued)

(52) U.S. Cl.
CPC ......... *H04W 4/14* (2013.01); *H04W 68/005* (2013.01); *H04W 76/28* (2018.02); *H04W 4/70* (2018.02);
(Continued)

(58) Field of Classification Search
CPC ...... H04W 4/14; H04W 76/28; H04W 68/005
See application file for complete search history.

(56) References Cited

U.S. PATENT DOCUMENTS

2013/0344890 A1* 12/2013 Hahn .................. H04W 60/00
                                                         455/456.1
2014/0370923 A1* 12/2014 Wu ........................ H04W 4/14
                                                         455/466

(Continued)

FOREIGN PATENT DOCUMENTS

WO       2016137475 A1    9/2016

OTHER PUBLICATIONS

Alcatel-Lucent (MT SMS procedures for UEs in extended idle mode DRX, 3GPP TSG CT4 Meeting #71, Anaheim, USA; Nov. 16-20, 2015) (Year: 2015).*

(Continued)

*Primary Examiner* — Said M Elnoubi
(74) *Attorney, Agent, or Firm* — Withrow & Terranova, PLLC

(57) ABSTRACT

The invention relates to mobility management nodes and methods of the mobility management nodes of enabling delivery of a Mobile Terminating (MT) Short Message (SM) to a mobile terminal. In a first aspect of the invention, a method of a mobility management node is provided for enabling delivery of a MT SM to a mobile terminal which currently is in extended idle mode Discontinuous Reception (eDRX) mode. The method comprises receiving an indication from a Short Message Service Gateway Mobile Switching Centre (SMS-GMSC) that the SM is to be delivered, receiving a notification that the mobile terminal has exited an eDRX mode before a paging occasion has occurred, and (Continued)

submitting, in response to the notification, a message indicating to the SMS-GMSC that the mobile terminal is available for delivery of the SM.

11 Claims, 12 Drawing Sheets

(51) Int. Cl.
*H04W 68/00* (2009.01)
*H04W 4/70* (2018.01)
*H04W 88/02* (2009.01)
*H04W 88/14* (2009.01)
*H04W 88/18* (2009.01)

(52) U.S. Cl.
CPC ............ *H04W 88/02* (2013.01); *H04W 88/14* (2013.01); *H04W 88/184* (2013.01)

(56) References Cited

U.S. PATENT DOCUMENTS

| | | | |
|---|---|---|---|
| 2015/0201452 A1* | 7/2015 | Wang | H04W 8/005 455/426.1 |
| 2016/0044578 A1 | 2/2016 | Vajapeyam et al. | |
| 2016/0100362 A1* | 4/2016 | Palanisamy | H04W 52/0212 370/311 |
| 2017/0142679 A1 | 5/2017 | Landais et al. | |

OTHER PUBLICATIONS

3GPP (TR23.709, Study on Optimizations to Support High Latency Communications, V1.2.0, May 2015), (Year: 2015).*
Author Unknown, "Technical Specification Group Services and System Aspects; Vocabulary for 3GPP Specifications (Release 12)," Technical Report 21.905, Version 12.0.0, 3GPP Organizational Partners, Jun. 2013, 64 pages.
Author Unknown, "Technical Specification Group Services and System Aspects; Study on Optimizations to Support High Latency Communications; Stage 2 (Release 13)," Technical Report 23.709, Version 1.2.0, 3GPP Organizational Partners, May 2015, 36 pages.
Author Unknown, "Technical Specification Group Core Network and Terminals; Technical realization of the Short Message Service (SMS) (Release 13)," Technical Specification 23.040, Version 13.2. 0, 3GPP Organizational Partners, Sep. 2016, 214 pages.
Author Unknown, "Technical Specification Group Radio Access Network; Evolved Universal Terrestrial Radio Access (E-UTRA); User Equipment (UE) procedures in idle mode (Release 12),"
Technical Specification 36.304, Version 12.6.0, 3GPP Organizational Partners, Sep. 2015, 38 pages.
Alcatel-Lucent, et al., "C4-152115: MT SMS procedures for UEs in extended idle mode DRX," Third Generation Partnership Project (3GPP) TSG CT4 Meeting #71, Nov. 16-20, 2015, 6 pages, Anaheim, California, USA.
Alcatel-Lucent, et al., "C4-152173: Mobile Terminating SMS Handling for extended Idle mode DRX," Change Request, Third Generation Partnership Project (3GPP) TSG CT4 Meeting #71, Nov. 16-20, 2015, 9 pages, Anaheim, California, USA.
Alcatel-Lucent, et al., "C4-152175: Mobile Terminating SMS Handling for extended Idle mode DRX" Change Request, Third Generation Partnership Project (3GPP) TSG CT4 Meeting #71, Nov. 16-20, 2015, 12 pages, Anaheim, California, USA.
Alcatel-Lucent, et al., "C4-161151: New Alert Procedure from MME/SGSM to SMS-GMSC for MT SMS to UE using eDRX," Third Generation Partnership Project (3GPP) TSG CT4 Meeting #72, Feb. 15-19, 2016, 10 pages, Jeju, Republic of Korea.
International Search Report and Written Opinion for International Patent Application No. PCT/EP2016/077871, dated Jan. 26, 2017, 16 pages.
International Preliminary Report on Patentability for International Patent Application No. PCT/EP2016/077871, dated Mar. 12, 2018, 12 pages.
Author Unknown, "Technical Specification Group Core Network and Terminals; Diameter based protocols to support Short Message Service (SMS) capable Mobile Management Entities (MMEs) (Release 12)," Technical Specification 29.338, Version 12.5.0, 3GPP Organizational Partners, Dec. 2015, 44 pages.
Alcatel-Lucent, et al., "C4-152177: Mobile Terminating SMS handling for extended Idle mode DRX—Additional Option," Change Request, Third Generation Partnership Project (3GPP) TSG CT4 Meeting #71, Nov. 16-20, 2015, 8 pages, Anaheim, California, USA.
Alcatel-Lucent, et al., "C4-152277: Mobile Terminating SMS handling for extended Idle mode DRX—Additional Option," Change Request, Third Generation Partnership Project (3GPP) TSG CT4 Meeting #71, Nov. 16-20, 2015, 8 pages, Anaheim, California, USA.
Examination Report for European Patent Application No. 16798690. 0, dated Jan. 14, 2019, 8 pages.
Ericsson, "S2-150779: Clean-up on FS_HLCOM TR," SA WG2 Meeting #108, Apr. 13-17, 2015, San Jose del Cabo, Mexico, 16 pages.
Search Report for Japanese Patent Application No. 2018-528709, dated Apr. 9, 2019, 47 pages.
Notice of Reasons for Rejection for Japanese Patent Application No. 2018-528709, dated Apr. 16, 2019, 10 pages.
Notification of Reason for Refusal for Korean Patent Application No. 10-2018-7015305, dated Apr. 12, 2019, 8 pages.

* cited by examiner

ENHANCEMENT OF MT SM DELIVERY FOR EDRX ENABLED MOBILE TERMINALS

This application is a 35 U.S.C. § 371 national phase filing of International Application No. PCT/EP2016/077871, filed Nov. 16, 2016, which claims the benefit of U.S. Provisional No. 62/262,006, filed Dec. 2, 2015, the disclosures of which are incorporated herein by reference in their entireties.

TECHNICAL FIELD

The invention relates to mobility management nodes and methods of the mobility management nodes of enabling delivery of a Mobile Terminating, (MT) Short Message (SM) to a mobile terminal.

The invention further relates to computer programs for causing the mobility management nodes to perform the methods according to the invention, and corresponding computer program products.

BACKGROUND

The Short Message Service (SMS) provides a means of sending messages of limited size to and from mobile terminals in 3rd Generation Partnership Project (3GPP) communications systems such as Global System for Mobile Communications (GSM), Universal Mobile Telecommunications System (UMTS) and Evolved Packet System (EPS). The provision of SMS makes use of a Service Centre, which acts as a store and forward centre for short messages.

Mobile terminal originated messages are transported from a terminal to the Service Centre, while mobile terminated messages shall be transported from the Service Centre to a terminal. Short messages are typically input to the Service Centre by other mobile users, and are destined for other mobile users, or for subscribers on a fixed network. This is described in detail in Technical Specification 3GPP TS 23.040.

Now, for extending battery lifetime of a mobile terminal, a method known as Discontinuous Reception (DRX) is used where the mobile terminal, oftentimes referred as a User Equipment (UE), only occasionally monitors a Physical Downlink Control Channel (PDCCH) to check if there is downlink data available.

Recently introduced UE types, such as Machine Type Communications (MTC) devices, require extremely efficient power saving, which has led to the introduction of a mode referred to as extended idle mode DRX (eDRX). That is, the UE and the network may negotiate over Non-Access Stratum (NAS) signaling the use of extended idle mode DRX for reducing its power consumption, while being available for mobile terminating data and/or network originated procedures within a certain delay dependent on the DRX cycle value. An eDRX enabled UE can only be reachable by the network (i.e. be paged by the network) during its paging transmission window (PTW), and during that window, the UE uses normal DRX.

In "MT SMS procedures for UEs in extended idle mode DRX", C4-152115, 3GPP TSG CT4 Meeting #71, Anaheim, USA; 16-20 Nov. 2015, it is described a mobile terminated (MT) short message (SM) delivery from a Short Message Service Centre (SMSC) to a Mobility Management Entity (MME).

Reference is made to the timing diagram of enclosed FIG. 1.

1. The SMSC submits a Send-Routing-Info-for-SM-Request (SRR) command to a Home Subscriber Server (HSS) to retrieve the address of the nodes serving the UE.
2. The HSS replies accordingly by submitting a Send-Routing-Info-for-SM-Answer (SRA) message, indicating the address of the serving MME.
3. The SMSC sends an MT-Forward-Short-Message-Request (TFR) to the serving MME. The SMSC indicates in the TFR a Max Retransmission Time (e.g. 5 to 10 minutes), which indicates for how long the SMSC is ready to store the SM if it cannot be delivered at once due to the UE being in extended idle mode DRX.
4. If the UE is reachable within the Max Retransmission Time provided in the TFR, the MME immediately sends an MT-Forward-Short-Message-Request-Answer (TFA) in step 4a indicating Requested Retransmission Time, i.e. the time at which the SM should be resent by the SMSC. The MME also pages the UE in 4b.

At this stage, the SMSC will not send a Report-SM-Delivery-Status-Request (RDR) to the HSS with the indication that the SM delivery was unsuccessful. Consequently, the HSS will not reply with a Report-SM-Delivery-Status-Answer (RDA) message, and will not store the Service Centre address in its Message Waiting Data (MWD).

5. The UE responds to the paging at which point in time a signalling connection is established between the UE and the MME.

At this stage, the MME does not send a Notify-Request (NOR) to the HSS to signal that the UE has become reachable.

6. The SMSC retransmits the SM at the Requested Retransmission Time which was indicated in the TFA (no Max Retransmission Time is included in this second transmission of the TFR).

The solution in "MT SMS procedures for UEs in extended idle mode DRX" is described to present the following merits:

a. MT SM for UEs in eDRX does not cause any extra HSS signalling.
b. No issue with short eDRX period (e.g. up to 20 s) of synchronization of messages received at HSS.
c. Single-attempt-delivery SM can be transmitted to the UE if this procedure is used (without the need to use MWD for single-attempt-delivery SM as previously has been specified).

The solution in "MT SMS procedures for UEs in extended idle mode DRX" is further described to present the following drawbacks:

a. SM retransmission is triggered without knowing for certain whether the UE indeed is reachable (e.g. the UE may have detached, the UE may be in a tunnel, the eDRX period may have been renegotiated, etc.).
b. Greater impact on SMSC (extended buffering of MT-SM e.g. for up to 5-10 min).
c. The Mobile Station Not Reachable Flag (MNRF) flag is not set in the HSS, so subsequent MT SM to the same UE from a different SMSC will trigger new MT Forward SM Request to MME for UEs which are unreachable.
d. Introduces a further method to deliver MT SMS for UEs using extended idle mode DRX.

The applicant has identified further drawbacks with this solution as will be discussed with reference to FIG. 2.

As in FIG. 1, the SMSC submits a TFR to the currently serving MME (MME1) to indicate that an SM is to be submitted to the UE. The TFR includes a Max Retransmission Time indicating how long the SMSC is ready to store the SM if it cannot be delivered at once due to the UE being in eDRX.

MME1 correspondingly replies with a TFA indicating Requested Retransmission Time at which the SM should be retransmitted by the SMSC, and will subsequently page the UE at a next paging occasion occurring just shortly before beginning of a next Paging Transmission Window, i.e. just before the indicated Requested Retransmission Time, such that the SM can be timely delivered from the SMSC via MME1 to the UE when the UE wakes of from its eDRX cycle at the Requested Retransmission Time.

Now, a first problem arises if the UE wakes up from its eDRX cycle, thus exiting eDRX mode, for instance due to a UE service request for sending data, and correspondingly initiates NAS signalling towards its currently serving mobility management node, e.g. an MME or a Serving GPRS (General Packet Radio Service) Support Node (SGSN), before having been paged by the serving mobility management node, in this particular example MME1.

NAS signalling is used to convey non-radio signalling between the UE and the MME for a Long Term Evolution/Evolved Universal Terrestrial Access Network (LTE/E-UTRAN) access. For instance, a NAS request may be a Routing Area Update (RAU) request which updates the location of the UE within the network. A UE initiates a RAU when it detects that it enters a new Routing Area, and thus it will contact the core network, either the current serving SGSN or a new SGSN.

Hence, the first problem can be exemplified as occurring in case of an intra SGSN RAU request, i.e. when the UE enters a new Routing Area, but is to remain at the serving SGSN, exemplified in FIG. 2 by SGSN1. When the SMSC attempts to submit the SM to the UE at the TFA specified Requested Retransmission Time, there is a risk that the UE again has entered eDRX mode, and the scheduled MT-SMS delivery will consequently fail. When UE is camping in UTRAN, the eDRX cycle will restart at each Routing Area Update procedure.

When the UE is camping in E-UTRAN and GSM, the paging occasion scheme can be maintained, if the serving MME or SGSN would maintain the eDRX cycle regardless of whether the UE requests to change the eDRX cycle at the TAU/RAU. In this scenario, the issue is less troublesome, but the MT-SMS is nevertheless unnecessarily delayed until the next scheduled paging time, extra signalling is required towards the UE, and UE power consumption increases, which indeed should be avoided.

Further, a second problem arises if the UE initiates a NAS request towards another mobility management node, thereby effecting an idle mode mobility procedure between two management nodes referred to as an inter MME TAU request, the other node being exemplified by MME2 in FIG. 2, before the UE has responded to the paging message from the network. That is, the paging message has not been sent by the first mobility management node since the paging window has not yet occurred.

This would e.g. occur if the UE initiates the MME TAU request after MME1 has reported the Requested Retransmission Time to the SMSC indicating a next paging occasion based on the eDRX cycle, but before the actual paging occasion occurs.

In this case, the SMSC would deliver the MT-SMS to the wrong MME, i.e. MME1, at the TFA specified Requested Retransmission Time.

SUMMARY

An object of the invention is to solve, or at least mitigate, at least one of these problems in the art and thus to provide improved methods of facilitating delivery of Short Messages to a mobile terminal enabled for eDRX mode.

This object is attained in a first aspect of the invention by a method of a mobility management node of enabling delivery of a Mobile Terminating, (MT) Short Message (SM) to a mobile terminal, which currently is in eDRX mode. The method comprises receiving an indication from a Short Message Service Gateway Mobile Switching Centre (SMS-GMSC) that the SM is to be delivered, receiving a notification that the mobile terminal has exited the eDRX mode before a paging occasion has occurred, and submitting, in response to the notification, a message indicating to the SMS-GMSC that the mobile terminal is available for delivery of the SM.

This object is attained in a second aspect of the invention by a mobility management node configured to enable delivery of an MT SM, to a mobile terminal which currently is in extended eDRX mode, and which mobility management node comprises a processing unit and a memory, said memory containing instructions executable by said processing unit, whereby said mobility management node is operative to receive an indication from an SMS-GMSC that the SM is to be delivered, receive a notification that the mobile terminal has exited the eDRX mode before a paging occasion has occurred, submit, in response to the notification, a message indicating to the SMS-GMSC that the mobile terminal sis available for delivery of the SM.

This object is attained in a third aspect of the invention by a method of a mobility management node of enabling delivery of an MT SM to a mobile terminal which currently is in eDRX mode, comprising receiving a notification that the mobile terminal has exited the eDRX mode before a paging occasion has occurred, submitting a context request to another mobility management node by which the mobile terminal was served before the notification was received, receiving from said another mobility management node a context response comprising an indication that the SM is to be delivered; and receiving, from the SMS-GMSC, the SM for delivery to the mobile terminal.

This object is attained in a fourth aspect of the invention by a mobility management node configured to enable delivery of an MT SM to a mobile terminal which currently is in eDRX mode, and which mobility management node comprises a processing unit and a memory, said memory containing instructions executable by said processing unit, whereby said mobility management node is operative to receive a notification that the mobile terminal has exited the eDRX mode before a paging occasion has occurred, submit a context request to another mobility management node by which the mobile terminal was served before the notification was received, receive, from said another mobility management node, a context response comprising an indication that the SM is to be delivered, and receive, from the SMS-GMSC, the SM for delivery to the mobile terminal.

In an embodiment, the message is submitted directly to the SMS-GMSC.

In another embodiment, the message is submitted to the SMS-GMSC via a Home Subscription Server (HSS).

In an embodiment, the message submitted to the SMS-GMSC via the HSS further comprises an instruction to the HSS to provide the destination address of the mobility management to the SMS-GMSC.

In still another embodiment, the notification is a Non-Access Stratum (NAS) request received from the mobile terminal.

In still an embodiment, the notification is a context request received from a serving mobility management node of the mobile terminal, and the method further comprises submitting, to the serving mobility management node, a context response comprising an indication that the SM is to be delivered, and receiving, from the serving mobility management node, a context acknowledgement comprising a destination address of the serving mobility management node for SM delivery, wherein said submitted message further comprises the destination address of the serving mobility management node.

In another embodiment, the notification is a context request received from a serving mobility management node of the mobile terminal, said message being submitted to the SMS-GSMC via the serving mobility management node in a context response and further comprising a destination address of the SMS-GSMC.

In still an embodiment, the receiving of an indication from a SMS-GMSC that the SM is to be delivered comprises receiving an indication of maximum retransmission time specifying how long the SMS-GMSC will store the SM if it cannot be delivered at once and capability indication indicating if the SMS-GMSC support receiving subsequent notification of mobile terminal availability for delivering the SM, the method further comprising submitting an indication to the SMS-GMSC comprising a requested retransmission time indicating at which point in time the SM should be retransmitted by the SMS-GMSC and capability confirmation that the mobility management node supports the subsequent notification of mobile terminal availability for delivering the SM.

In a further embodiment, the message submitted further indicates a time period specifying the time up until the mobile terminal again enters the eDRX mode.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 6 illustrates a further embodiment of a method of the invention;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
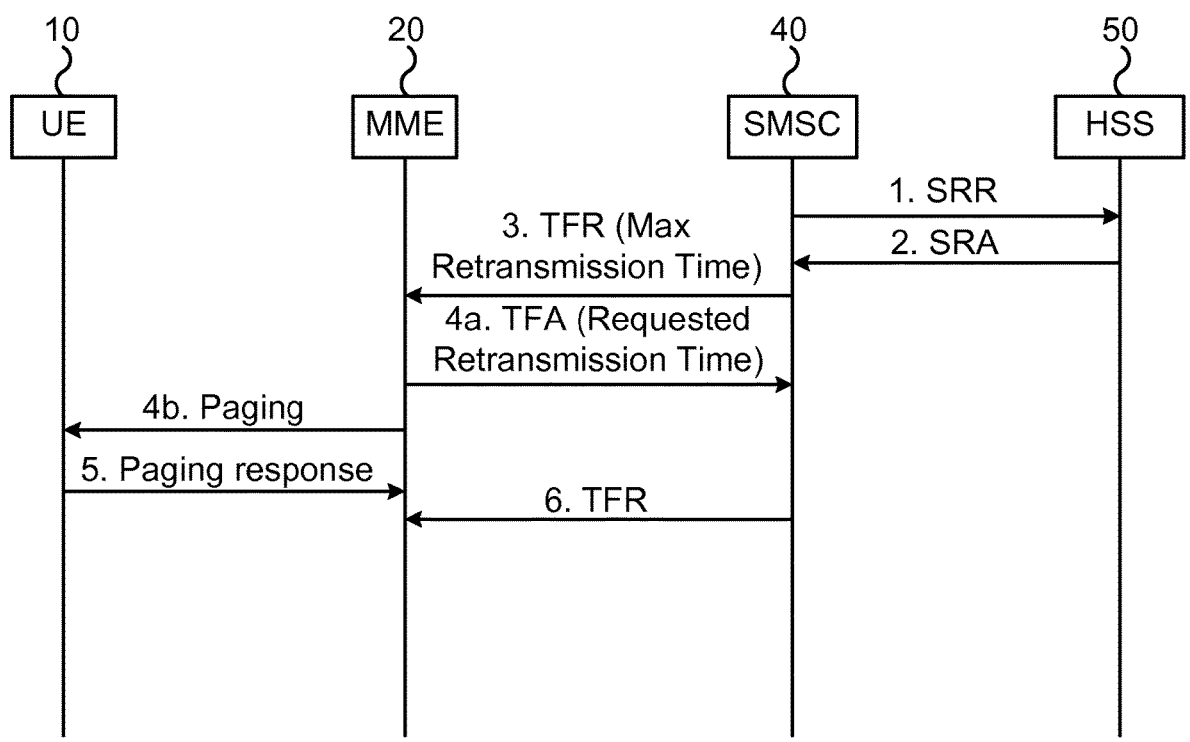
FIG. 1 shows a prior art timing diagram illustrating an MT SM delivery from an SMSC to an MME.

FIG. 1 shows a timing diagram illustrating an MT SM delivery from an SMSC to an MME disclosed in "MT SMS procedures for UEs in extended idle mode DRX", as previously discussed.

Figure 2:
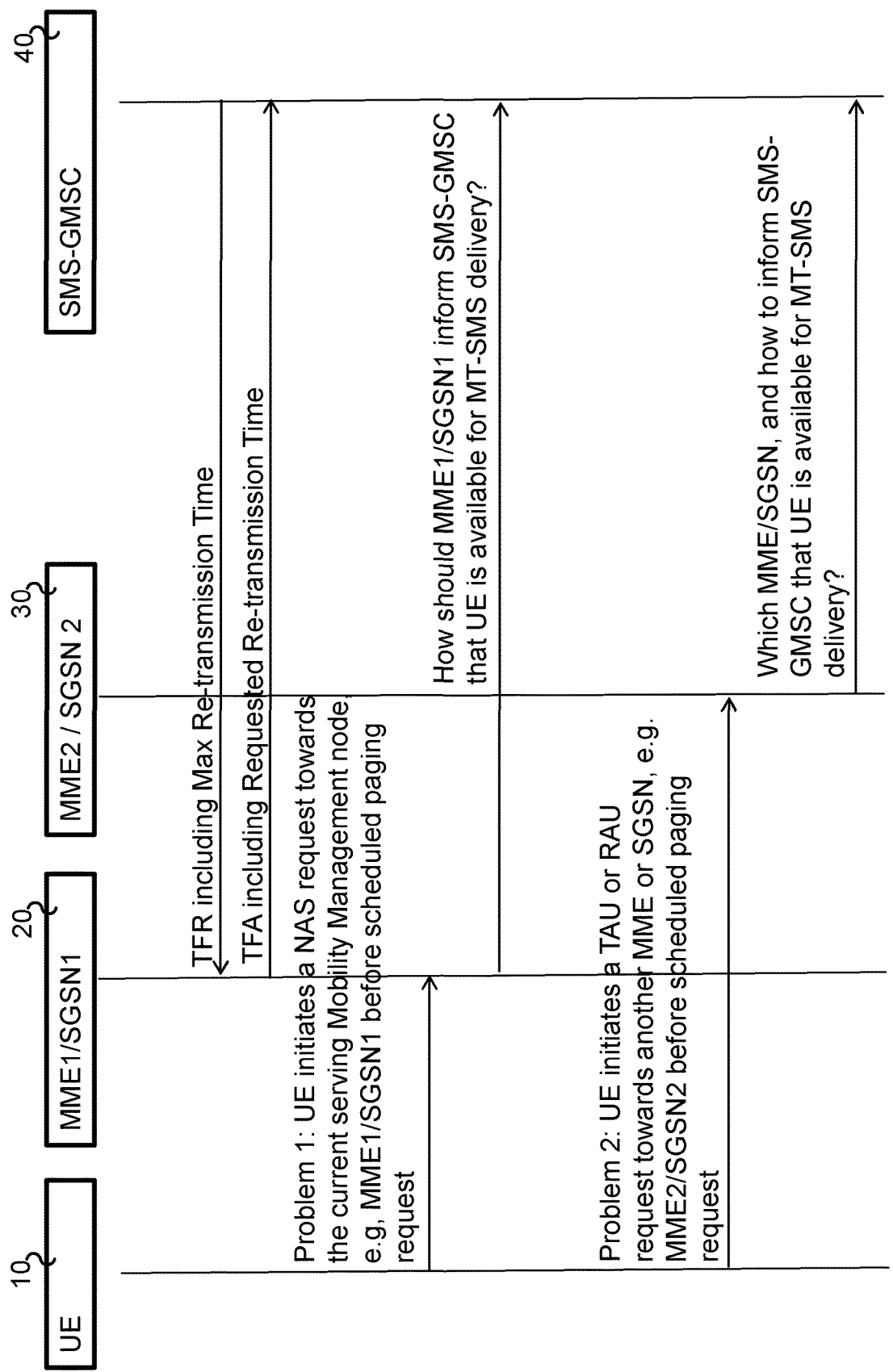
FIG. 2 shows a timing diagram illustrating problems related to the MT SM delivery procedure of FIG. 1.

FIG. 2 shows a timing diagram illustrating problems related to the MT SM delivery procedure of FIG. 1, as previously has been discussed. The SMSC will in the following be referred to as a Short Message Service Gateway Mobile Switching Centre (SMS-GMSC).

In short, a first problem arises if the UE 10 wakes up from an eDRX cycle, i.e. it exits an eDRX mode in which it has been residing, before a next paging occasion takes place. The SMS-GMSC 40 has been scheduled for SM delivery at the next paging occasion, and will thus miss the opportunity to deliver the SM to the UE 10 exiting the eDRX mode via MME1/SGSN1 20; once the next paging occasion occurs, there is a risk that the UE 10 again has entered eDRX mode, resulting in another SM delivery failure, and the procedure must be repeated.

Further, a second problem arises if the UE 10 exits an eDRX mode in which it has been residing before a next paging occasion takes place, in this scenario by performing e.g. an inter MME TAU. In such a scenario, when the SMS-GMSC 40 is scheduled for SM delivery at the next paging occasion, the SMS-GMSC 40 will deliver the SM to MME1/SGSN1 20, which no longer is the serving MME, instead of delivering the SM to MME2/SGSN2 30.

In the following, MME1/SGSN1 and MME2/SGSN2 will be referred to MME1 and MME2, respectively. However, it should be noted that they embody mobility management nodes of both UTRAN and E-UTRAN.

Figure 3:
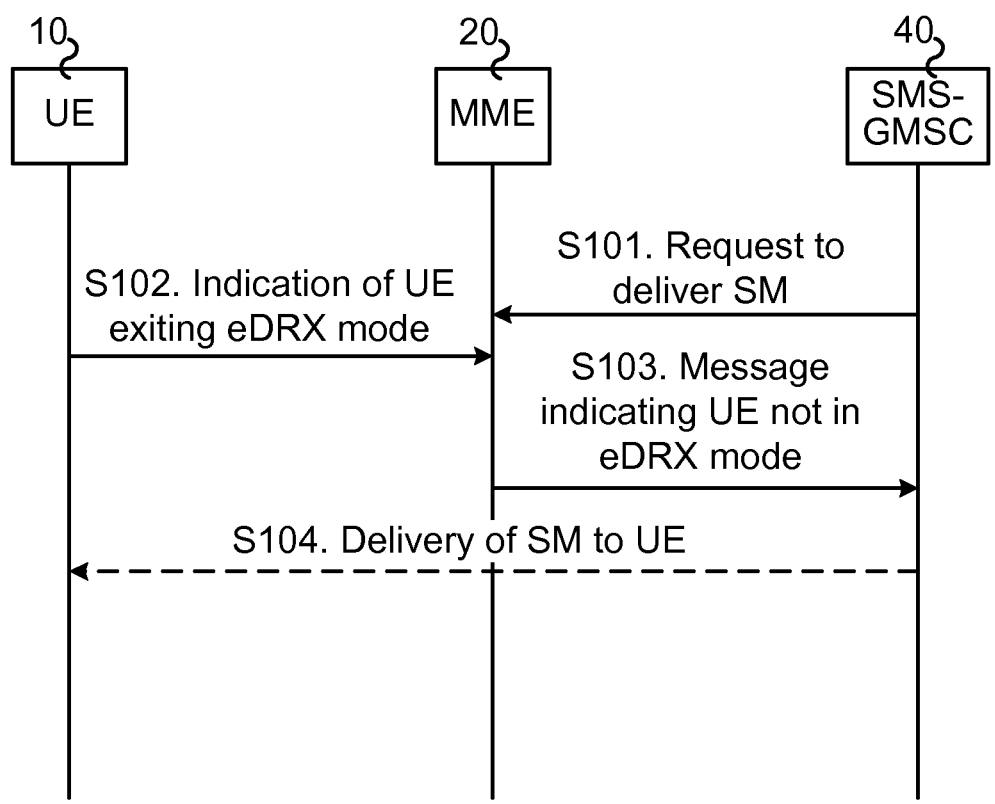
FIG. 3 illustrates an embodiment of a method of the invention.

FIG. 3 illustrates an embodiment of a method of the invention performed at MME1 20 of enabling delivery of an MT SM from the SMS-GMSC 40 to the UE 10.

In a first step S101, MME1 20 receives an indication from the SMS-GMSC 40 that an SM is to be delivered to the UE 10, which currently is in eDRX mode. Now, if the UE 10 exits the eDRX mode, for instance as a consequence of a NAS request for intra MME TAU, intra SGSN RAU, or a general Service Request, etc., before a paging occasion has occurred, MME1 20 will receive a notification accordingly in a second step S102.

In a third step S103, MME1 20 submits to the SMS-GMSC 40, in response to the indication received in step S102, a message indicating that the UE 10 is available for immediate delivery of the SM. As a result, the SMS-GMSC will advantageously not miss out on the opportunity to deliver the SM to the UE 10, which is currently not in eDRX mode, in step S104 via MME1 20.

In an alternative embodiment, the message is not submitted directly to the SMS-GMSC 40, but via an HSS (not shown in FIG. 3). In such embodiment, the message submitted to the SMS-GMSC 40 via the HSS further comprises an instruction to the HSS to provide the destination address of MME1 20 (which is known to the HSS) to the SMS-GMSC 40, in order for the SMS-GSMC 40 to be able to deliver the SM to the UE 10 via MME1 20.

Figure 4:
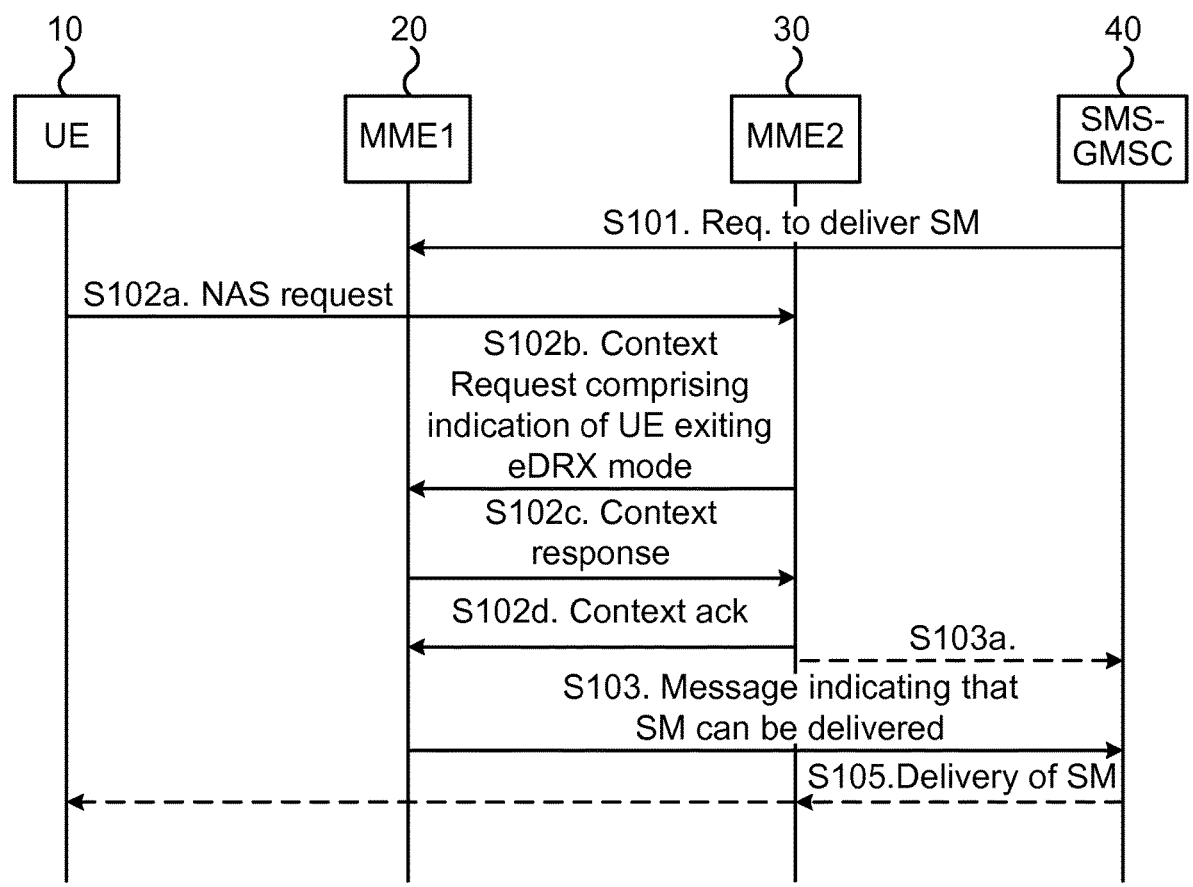
FIG. 4 illustrates another embodiment of a method of the invention.

FIG. 4 illustrates an embodiment of a method of the invention of enabling delivery of an MT SM from the SMS-GMSC 40 to the UE 10.

In a first step S101, MME1 20 receives an indication from the SMS-GMSC 40 that an SM is to be delivered to the UE 10, which currently is in eDRX mode. Now, if the UE 10 exits the eDRX mode, for instance as a consequence of a NAS request in step S102a for TAU, RAU, or a general Service Request, etc., to an MME2 30 before a paging occasion has occurred, the other MME1 20 will receive a notification accordingly. However, in contrast to the embodiment described with reference to FIG. 3, the notification is in this scenario not received from the UE 10, but from MME2 (now being the serving MME) in the form of a Context Request in step S102b.

As a consequence, MME1 20 submits a Context Response in step S102c to be received by MME2 30 and comprising an indication that the SM is to be delivered. In response thereto, MME1 20 receives a Context Acknowledgement sent by MME2 in step S102d and comprising a destination address of the new serving MME, i.e. MME2 30, for subsequent SM delivery.

In step S103, MME1 20 submits to the SMS-GMSC 40, in response to the notification received in step S102b, a message indicating that the UE 10 is available for immediate delivery of the SM, which message in this embodiment further comprises the destination address of MME2 30 being the serving MME.

As a result, the SMS-GMSC 40 will advantageously deliver the SM to the correct MME in step S105, i.e. to MME2 30, and further on to the UE 10, which is currently not in eDRX mode.

With reference again to FIG. 4, in an alternative embodiment, the notification of the UE 10 having exited eDRX mode is again received in the form of a context request in step S102b from MME2 30. However, the message indicating that the SM can be delivered immediately to the UE 10 is submitted in step S103a to the SMS-GSMC 40 via MME2 30 in the Context Response in step S102c, which message in this embodiment further comprises a destination address of the SMS-GSMC 40 for the information of MME2 30.

It may, similar to the embodiment discussed with reference to FIG. 4, be envisaged in an embodiment that the message is not submitted directly to the SMS-GMSC 40, but via an HSS (not shown in FIG. 4). In such embodiment, the message submitted to the SMS-GMSC 40 via the HSS further comprises an instruction to the HSS to provide the destination address of MME2 30 to the SMS-GMSC 40, in order for the SMS-GSMC 40 to be able to deliver the SM to the UE 10 via the correct MME, i.e. MME2 30.

With reference to FIGS. 3 and 4, it can be envisaged in embodiments that step S101, where MME1 20 receives an indication from the SMS-GMSC 40 that an SM is to be delivered to the UE 10, which currently is in eDRX mode, is expanded to include steps 101a and 101b of FIG. 5 to be described in the following.

Figure 5:
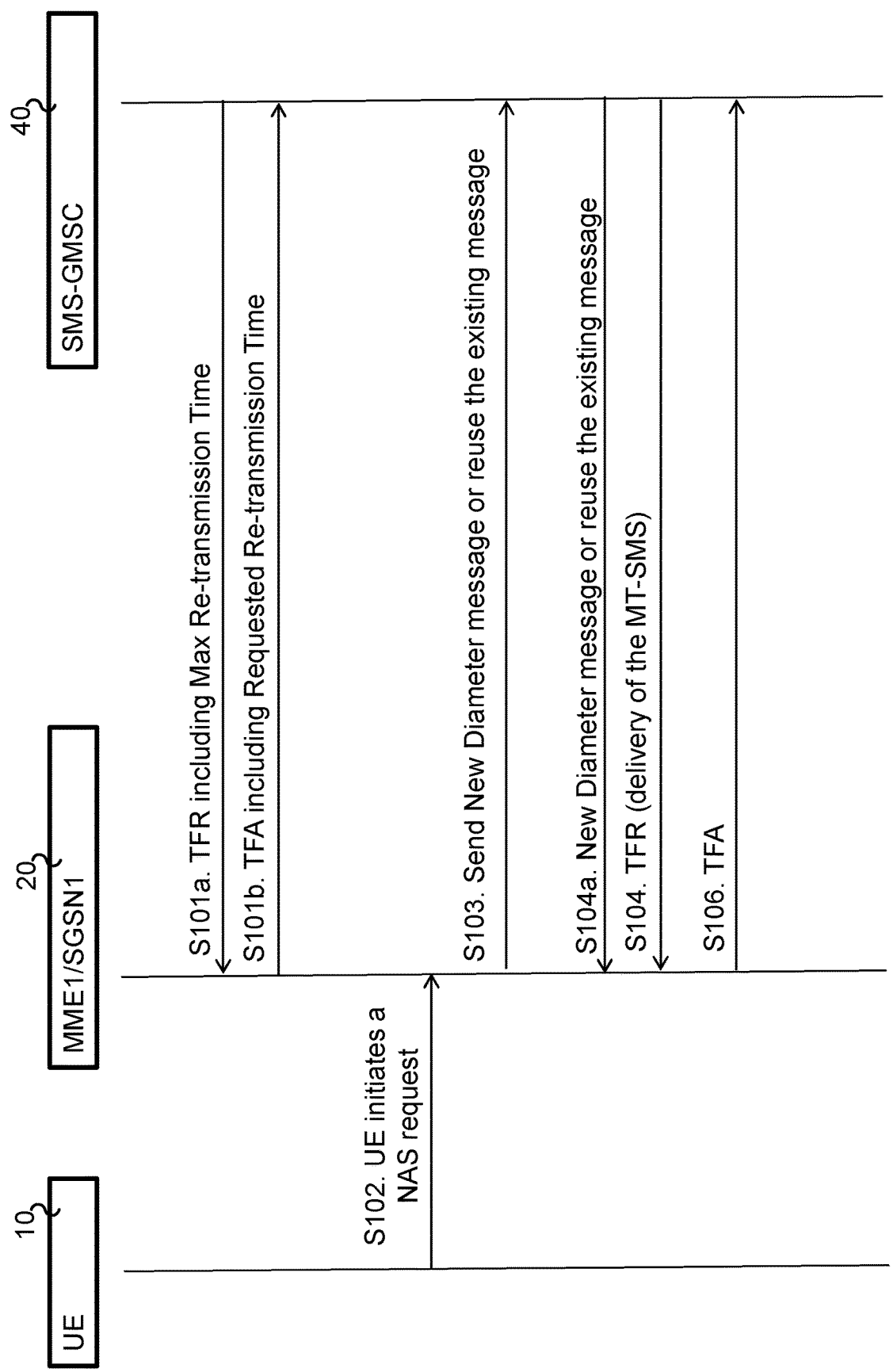
FIG. 5 illustrates yet another embodiment of a method of the invention.

FIG. 5 illustrates an embodiment of the invention performed at MME1 20 of enabling delivery of an MT SM from the SMS-GMSC 40 to the UE 10 based on the embodiment previously discussed with reference to FIG. 3.

In a first step S101a, MME1 20 receives an indication from the SMS-GMSC 40 that an SM is to be delivered to the UE 10 in the form of a TFR including a Max Retransmission Time, which indicates how long the SMS-GMSC 40 will store the SM if it cannot be delivered at once, and further a capability indication indicating if the SMS-GMSC 40 support receiving subsequent notification of UE availability for delivering the SM.

Thereafter, in step S101b, MME1 20 responds with a TFA indicating Requested Retransmission Time, i.e. the time at which the SM should be retransmitted by the SMS-GMSC 40 since the UE 10 currently is in an eDRX mode. The TFA further indicates whether MME1 supports subsequent notification of UE availability for delivering the SM when the UE 10 exits eDRX mode.

As previously has been described, if the UE 10 exits the eDRX mode, for instance as a consequence of a NAS request for intra MME TAU, intra SGSN RAU, or a general Service Request, etc., before a paging occasion has occurred, MME1 20 will receive a notification accordingly in step S102.

In a step S103, MME1 20 submits to the SMS-GMSC 40, in response to the indication received in step S102, a message indicating that the UE 10 is available for immediate delivery of the SM. As a result, the SMS-GMSC will advantageously not miss out on the opportunity to deliver the SM to the UE 10, which is currently not in eDRX mode, in step S104 via MME1 20.

Optionally, for all embodiments of the invention, the message includes a Maximum-UE-Availability-Time, i.e. a time period specifying the time up until the UE 10 again enters the eDRX mode, thereby advantageously indicating a time window during which the UE 10 will be available for SM delivery.

As can be seen in FIG. 5, the submission in step S103 either uses an existing message such as an OFR, or a new Diameter message. The SMS-GMSC 40 acknowledges the message in step S104a correspondingly using an existing message such as an OFA, or a new Diameter message.

The pending SM is delivered by the SMS-GMSC 40 in the TFR of step S104, and MME1 acknowledges the delivery accordingly with a TFA in step S106.

Figure 6:
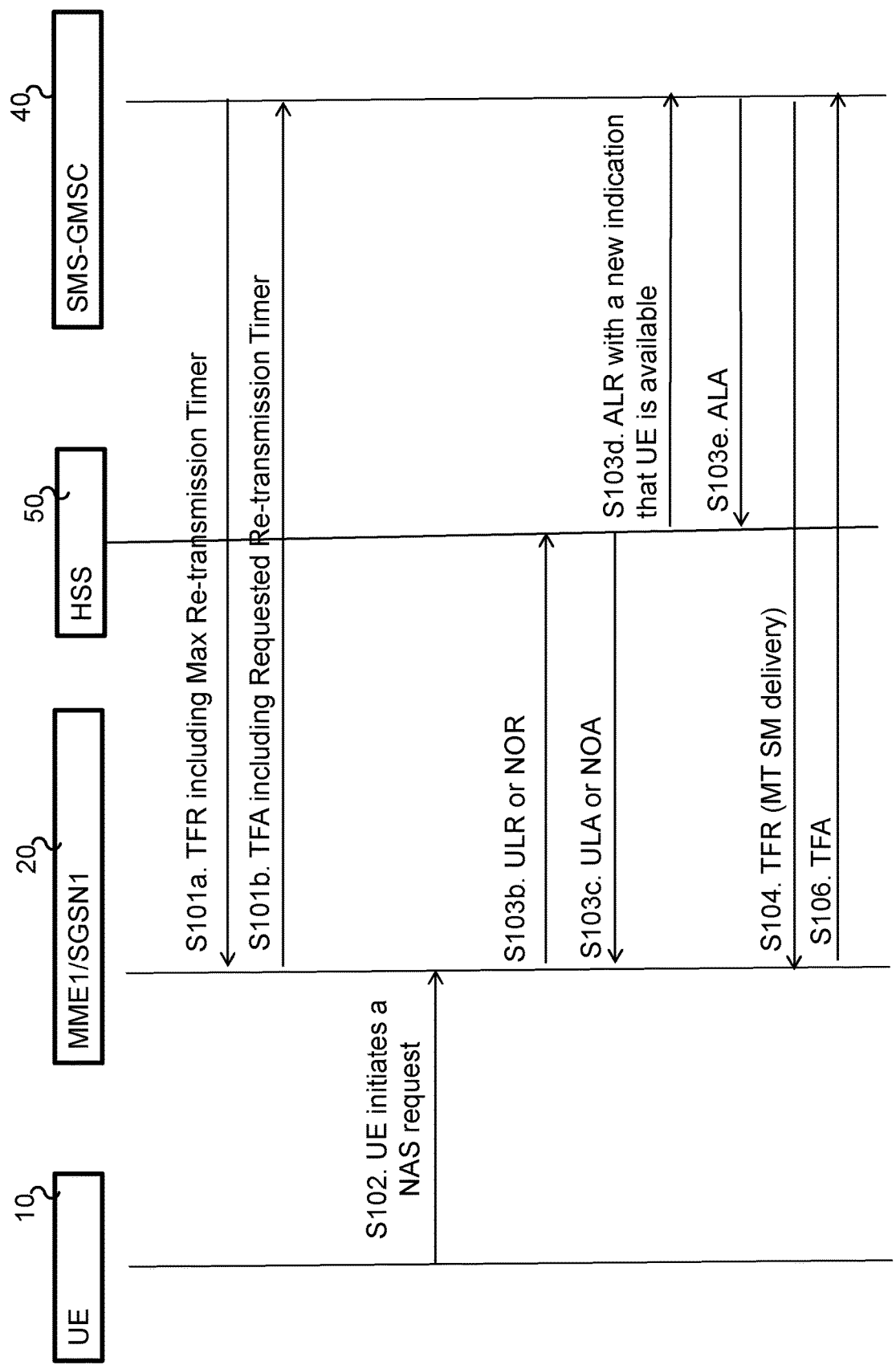
FIG. 6 illustrates still another embodiment of a method of the invention.

FIG. 6 illustrates an embodiment of the invention performed at MME1 20 of enabling delivery of an MT SM from the SMS-GMSC 40 to the UE 10 based on an embodiment previously discussed with reference to FIG. 4.

In a first step S101a, MME1 20 receives an indication from the SMS-GMSC 40 that an SM is to be delivered to the UE 10 in the form of a TFR including a Max Retransmission Time, which indicates how long the SMS-GMSC 40 will store the SM if it cannot be delivered at once, and further a capability indication indicating if the SMS-GMSC 40 support receiving subsequent notification of UE availability for delivering the SM.

Thereafter, in step S101b, MME1 20 responds with a TFA indicating Requested Retransmission Time, i.e. the time at which the SM should be retransmitted by the SMS-GMSC 40 since the UE 10 currently is in an eDRX mode. The TFA further indicates whether MME1 supports subsequent notification of UE availability for delivering the SM when the UE 10 exits eDRX mode.

As previously has been described, if the UE 10 exits the eDRX mode, for instance as a consequence of a NAS request for intra MME TAU, intra SGSN RAU, or a general Service Request, etc., before a paging occasion has occurred, MME1 20 will receive a notification accordingly in a second step S102.

In step S103*b*, MME1 20 submits to the SMS-GMSC 40, via the HSS 50, in response to the indication received in step S102, a message indicating that the UE 10 is available for immediate delivery of the SM. The message may be submitted e.g. in the form of an Update Location Request (ULR) or Notify-Request (NOR) and includes an instruction to the HSS 50 to subsequently provide the destination address of MME1 20 to the SMS-GMSC 40.

The HSS 50 responds accordingly in step S103*c* with an acknowledgement in the form of e.g. a Update Location Answer (ULA) or Notify-Answer (NOA), and sends in step S103*d* the message indicating UE availability and address of MME1 20 in an Alert-Service-Centre-Request (ALR). The SMS-GMSC thus sends an acknowledgement Alert-Service-Centre-Answer (ALA) in step S103*e* to the HSS 50.

Optionally, the message in S103*b* and S103*d* includes a Maximum-UE-Availability-Time, i.e. a time period specifying the time up until the UE 10 again enters the eDRX mode, thereby advantageously indicating a time window during which the UE 10 will be available for SM delivery.

The pending SM is delivered by the SMS-GMSC 40 in the TFR of step S104, and MME1 acknowledges the delivery accordingly with a TFA in step S106. As a result, the SMS-GMSC 40 will advantageously not miss out on the opportunity to deliver the SM to the UE 10, which is currently not in eDRX mode, in step S104 via MME1 20.

Figure 7:
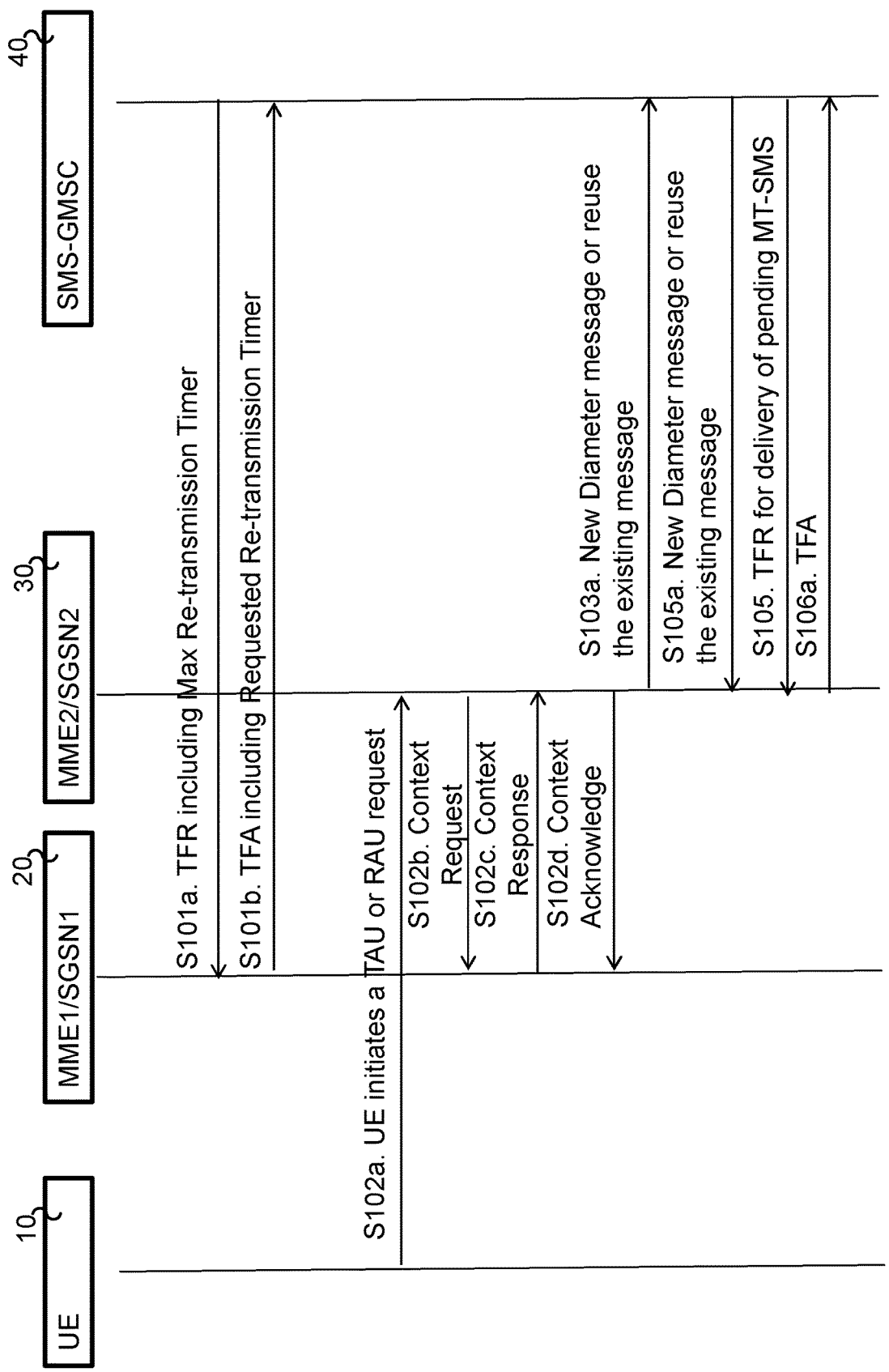
FIG. 7 illustrates yet a further embodiment of a method of the invention.

FIG. 7 illustrates an embodiment of the invention of enabling delivery of an MT SM from the SMS-GMSC 40 to the UE 10 based on an embodiment previously discussed with reference to FIG. 4.

In a first step S101*a*, MME1 20 receives an indication from the SMS-GMSC 40 that an SM is to be delivered to the UE 10 in the form of a TFR including a Max Retransmission Time, which indicates how long the SMS-GMSC 40 will store the SM if it cannot be delivered at once, and further a capability indication indicating if the SMS-GMSC 40 support receiving subsequent notification of UE availability for delivering the SM.

Thereafter, in step S101*b*, MME1 20 responds with a TFA indicating Requested Retransmission Time, i.e. the time at which the SM should be retransmitted by the SMS-GMSC 40 since the UE 10 currently is in an eDRX mode. The TFA further indicates whether MME1 supports subsequent notification of UE availability for delivering the SM when the UE 10 exits eDRX mode.

If the UE 10 exits the eDRX mode, for instance as a consequence of a NAS request in step S102*a* for TAU, RAU, or a general Service Request, etc., to MME2 30 before a paging occasion has occurred, MME1 20 will receive a notification accordingly from MME2 30 (now being the serving MME) in the form of a Context Request in step S102*b*.

As a consequence, MME1 20 submits a Context Response in step S102*c* to MME2 30 comprising an indication that the SM is to be delivered, which message in this embodiment further comprises a destination address of the SMS-GSMC 40 for the information of MME2 30. In response thereto, MME2 30 transmits a Context Acknowledgement in step S102*d* to MME1 20.

In step S103*a*, MME2 30 submits to the SMS-GMSC 40, in response to the indication received in step S102*c*, a message indicating that the UE 10 is available for immediate delivery of the SM. As a result, the SMS-GMSC 40 will advantageously deliver the SM to the correct MME in step S105, i.e. to MME2 30, and further on to the UE 10, which is currently not in eDRX mode.

Optionally, the message includes a Maximum-UE-Availability-Time, i.e. a time period specifying the time up until the UE 10 again enters the eDRX mode, thereby advantageously indicating a time window during which the UE 10 will be available for SM delivery.

As can be seen in FIG. 7, the submission in step S103*a* either uses an existing message such as an OFR, or a new Diameter message. The SMS-GMSC 40 acknowledges the message in step S105*a* correspondingly using an existing message such as an OFA, or a new Diameter message.

The pending SM is delivered by the SMS-GMSC 40 in the TFR of step S105, and MME2 30 acknowledges the delivery accordingly with a TFA in step S106*a*.

Figure 8:
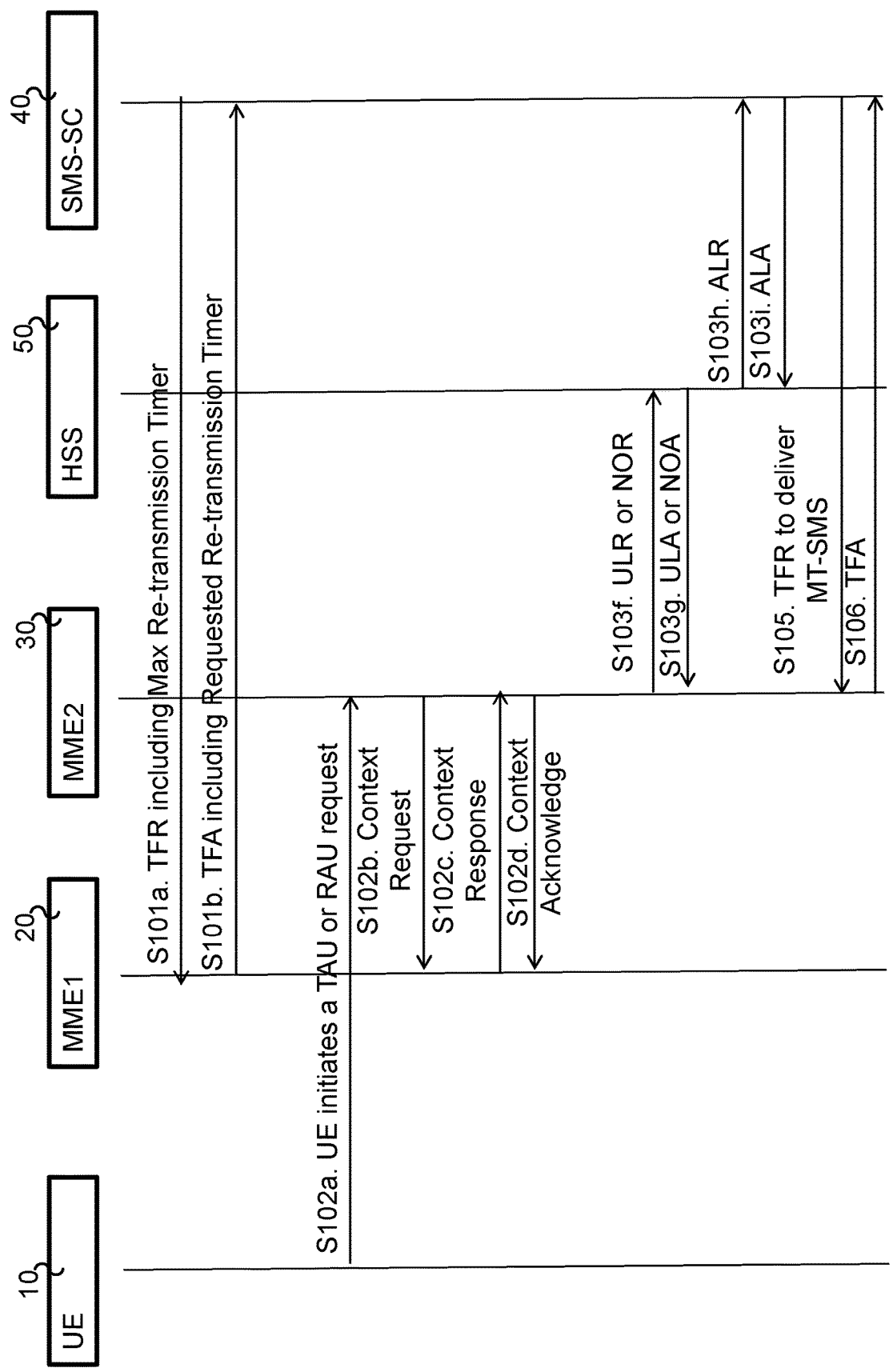
FIG. 8 illustrates still a further embodiment of a method of the invention.

FIG. 8 illustrates an embodiment of the invention of enabling delivery of an MT SM from the SMS-GMSC 40 to the UE 10 related to that previously discussed with reference to FIG. 7.

However, in this particular embodiment, the message indicating UE availability for SM delivery is sent by MME2 30 to the SMS-GSMC 40 via the HSS 50.

In a first step S101*a*, MME1 20 receives an indication from the SMS-GMSC 40 that an SM is to be delivered to the UE 10 in the form of a TFR including a Max Retransmission Time, which indicates how long the SMS-GMSC 40 will store the SM if it cannot be delivered at once, and further a capability indication indicating if the SMS-GMSC 40 support receiving subsequent notification of UE availability for delivering the SM.

Thereafter, in step S101*b*, MME1 20 responds with a TFA indicating Requested Retransmission Time, i.e. the time at which the SM should be retransmitted by the SMS-GMSC 40 since the UE 10 currently is in an eDRX mode. The TFA further indicates whether MME1 supports subsequent notification of UE availability for delivering the SM when the UE 10 exits eDRX mode.

If the UE 10 exits the eDRX mode, for instance as a consequence of a NAS request in step S102*a* for TAU, RAU, or a general Service Request, etc., to MME2 30 before a paging occasion has occurred, MME1 20 will receive a notification accordingly from MME2 30 (now being the serving MME) in the form of a Context Request in step S102*b*.

As a consequence, MME1 20 submits a Context Response in step S102*c* to MME2 30 comprising an indication that the SM is to be delivered, which message in this embodiment further comprises a destination address of the SMS-GSMC 40 for the information of MME2 30. In response thereto, MME2 30 transmits a Context Acknowledgement in step S102*d* to MME1 20.

In step S103*f*, MME2 30 submits to the SMS-GMSC 40, via the HSS 50, in response to the indication received in step S102*c*, a message indicating that the UE 10 is available for immediate delivery of the SM. The message may be submitted e.g. in the form of an ULR or NOR and includes an instruction to the HSS 50 to subsequently provide the destination address of MME2 30 to the SMS-GMSC 40.

The HSS 50 responds accordingly in step S103g with an acknowledgement in the form of e.g. a ULA or NOA, and sends in step S103h the message indicating UE availability and address of MME2 30 in an ALR. The SMS-GMSC 40 thus sends an acknowledgement (ALA) in step S103i to the HSS 50.

Optionally, the message in steps S103f and S103h includes a Maximum-UE-Availability-Time, i.e. a time period specifying the time up until the UE 10 again enters the eDRX mode, thereby advantageously indicating a time window during which the UE 10 will be available for SM delivery.

The SMS-GMSC 40 will advantageously deliver the SM to the correct MME in step S105, i.e. to MME2 30, and further on to the UE 10, which is currently not in eDRX mode, and MME2 30 acknowledges the delivery accordingly with a TFA in step S106a.

Figure 9:
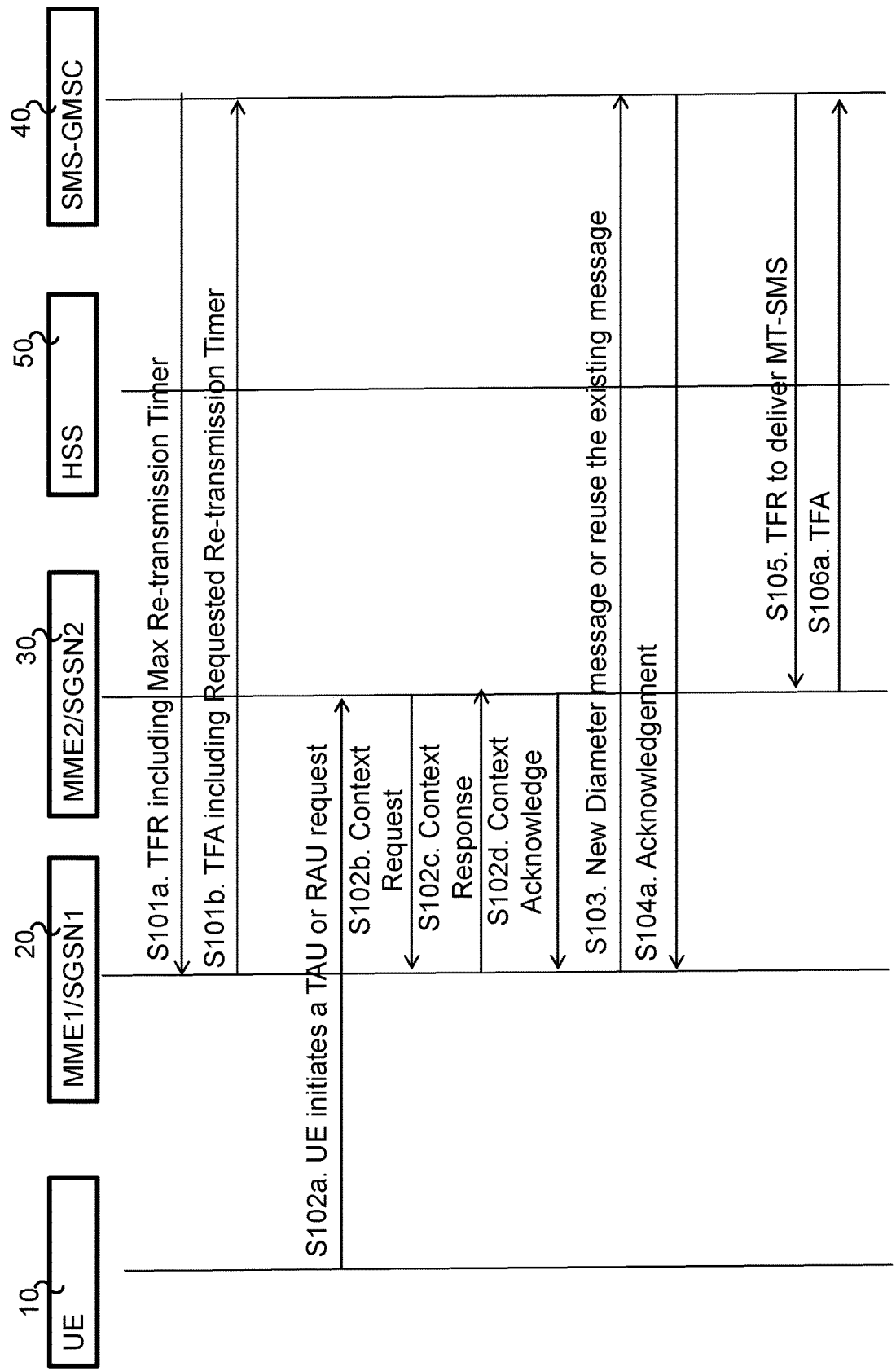
FIG. 9 illustrates another embodiment of a method of the invention.

FIG. 9 illustrates an embodiment of the invention of enabling delivery of an MT SM from the SMS-GMSC 40 to the UE 10 based on an embodiment previously discussed with reference to FIG. 4.

In a first step S101a, MME1 20 receives an indication from the SMS-GMSC 40 that an SM is to be delivered to the UE 10. Preferably the indication is in the form of a TFR including a Max Retransmission Time, which indicates how long the SMS-GMSC 40 will store the SM if it cannot be delivered at once. The indication may further include a capability indication indicating if the SMS-GMSC 40 support receiving subsequent notification of UE availability for delivering the SM.

Thereafter, in step S101b, MME1 20 responds to the SMS-GMSC 40, preferably with a TFA indicating Requested Retransmission Time, i.e. the time at which the SM should be retransmitted by the SMS-GMSC 40 since the UE 10 currently is in an eDRX mode. The TFA may further indicate whether MME1 supports subsequent notification of UE availability for delivering the SM when the UE 10 exits eDRX mode.

If the UE 10 exits the eDRX mode, for instance as a consequence of a NAS request in step S102a for TAU, RAU, or a general Service Request, etc., to an MME2 30 before a paging occasion has occurred, the other MME1 20 will receive a notification accordingly from MME2 30 (now being the serving MME) in the form of a Context Request in step S102b.

As a consequence, MME1 20 submits a Context Response in step S102c to MME2 30 comprising an indication that the SM is to be received by MME2 30. In response thereto, MME2 30 transmits a Context Acknowledgement in step S102d to MME1 20 comprising a destination address of MME2 30.

In step S103, MME1 20 submits to the SMS-GMSC 40 a message indicating that the UE 10 is available for immediate delivery of the SM, and the destination address of MME2 30. As a result, the SMS-GMSC 40 will advantageously deliver the SM to the correct MME in step S104, i.e. to MME2 30, and further on to the UE 10, which is currently not in eDRX mode.

Optionally, the message includes a Maximum-UE-Availability-Time, i.e. a time period specifying the time up until the UE 10 again enters the eDRX mode, thereby advantageously indicating a time window during which the UE 10 will be available for SM delivery.

As can be seen in FIG. 9, the submission in step S103 either uses an existing message such as an OFR, or a new Diameter message. The SMS-GMSC 40 acknowledges the message in step S104a correspondingly using an existing message such as an OFA, or a new Diameter message.

The pending SM is delivered by the SMS-GMSC 40 in the TFR of step S105, and MME2 30 acknowledges the delivery accordingly with a TFA in step S106a.

Figure 10:
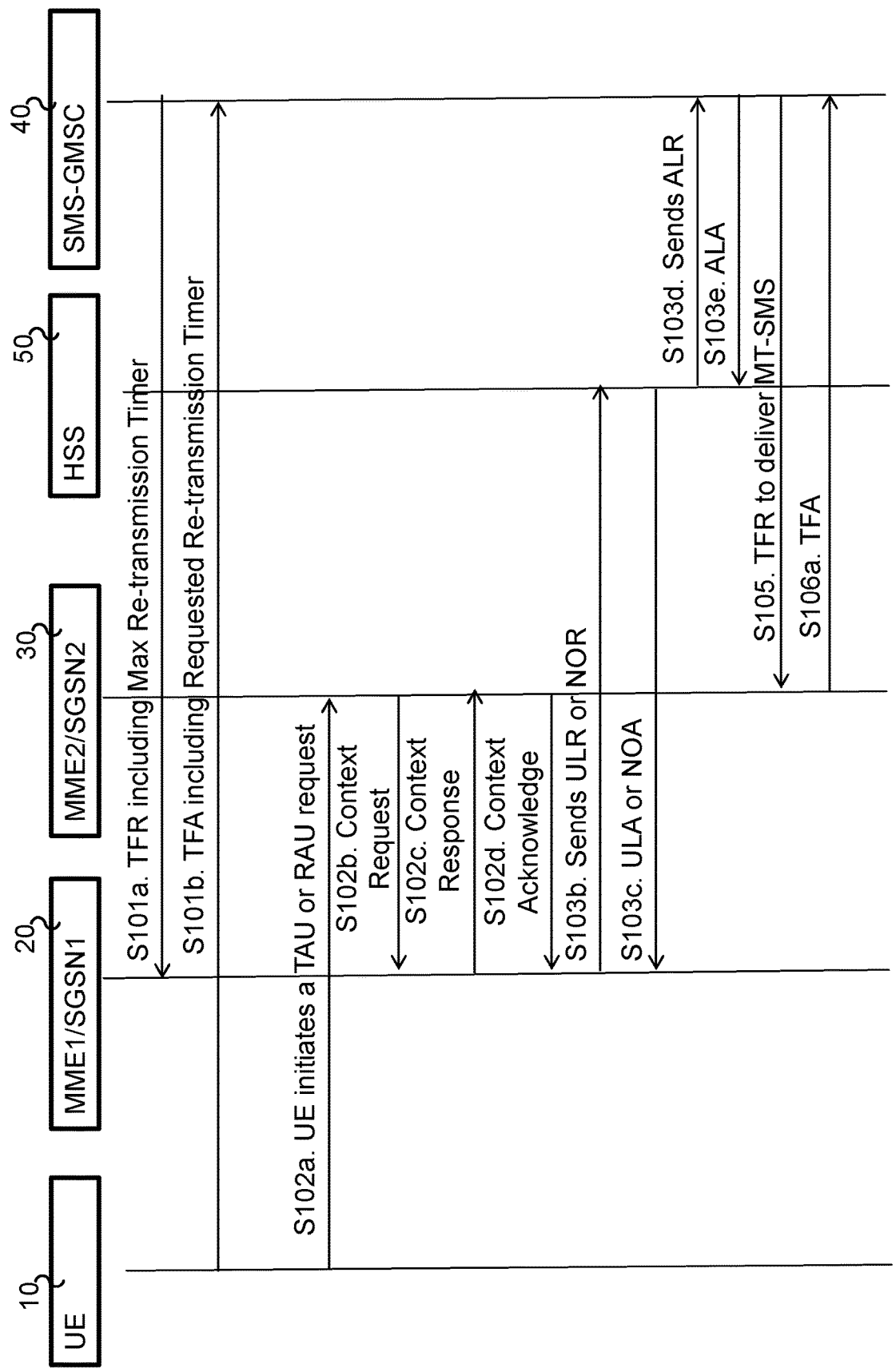
FIG. 10 illustrates yet another embodiment of a method of the invention.

FIG. 10 illustrates an embodiment of the invention of enabling delivery of an MT SM from the SMS-GMSC 40 to the UE 10 related to that previously discussed with reference to FIG. 9.

However, in this particular embodiment, the message indicating UE availability for SM delivery is sent by MME1 20 to the SMS-GSMC 40 via the HSS 50.

In a first step S101a, MME1 20 receives an indication from the SMS-GMSC 40 that an SM is to be delivered to the UE 10 in the form of a TFR including a Max Retransmission Time, which indicates how long the SMS-GMSC 40 will store the SM if it cannot be delivered at once, and further a capability indication indicating if the SMS-GMSC 40 support receiving subsequent notification of UE availability for delivering the SM.

Thereafter, in step S101b, MME1 20 responds with a TFA indicating Requested Retransmission Time, i.e. the time at which the SM should be retransmitted by the SMS-GMSC 40 since the UE 10 currently is in an eDRX mode. The TFA further indicates whether MME1 supports subsequent notification of UE availability for delivering the SM when the UE 10 exits eDRX mode.

If the UE 10 exits the eDRX mode, for instance as a consequence of a NAS request in step S102a for TAU, RAU, or a general Service Request, etc., to MME2 30 before a paging occasion has occurred, MME1 20 will receive a notification accordingly from MME2 30 (now being the serving MME) in the form of a Context Request in step S102b.

As a consequence, MME1 20 submits a Context Response in step S102c to MME2 30 comprising an indication that the SM is to be delivered. In response thereto, MME2 30 transmits a Context Acknowledgement in step S102d to MME1 20 comprising a destination address of MME2 30.

In step S103b, MME1 20 submits to the SMS-GMSC 40, via the HSS 50, a message indicating that the UE 10 is available for immediate delivery of the SM. The message may be submitted e.g. in the form of an ULR or NOR and includes an instruction to the HSS 50 to subsequently provide the destination address of MME2 30 to the SMS-GMSC 40.

The HSS 50 responds accordingly in step S103c with an acknowledgement in the form of e.g. a ULA or NOA, and sends in step S103d the message indicating UE availability and address of MME2 30 in an ALR. The SMS-GMSC 40 thus sends an acknowledgement (ALA) in step S103e to the HSS 50.

Optionally, the message in S103b and S103d includes a Maximum-UE-Availability-Time, i.e. a time period specifying the time up until the UE 10 again enters the eDRX mode, thereby advantageously indicating a time window during which the UE 10 will be available for SM delivery.

The SMS-GMSC 40 will advantageously deliver the SM to the correct MME in step S105, i.e. to MME2 30, and further on to the UE 10, which is currently not in eDRX mode, and MME2 30 acknowledges the delivery accordingly with a TFA in step S106a.

Figure 11:
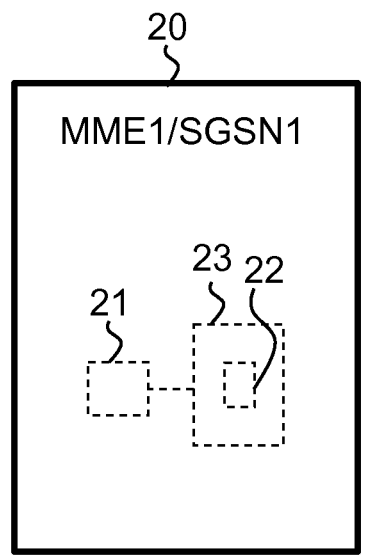
FIG. 11 illustrates embodiments of a mobility management node of the invention.
Figure 11:
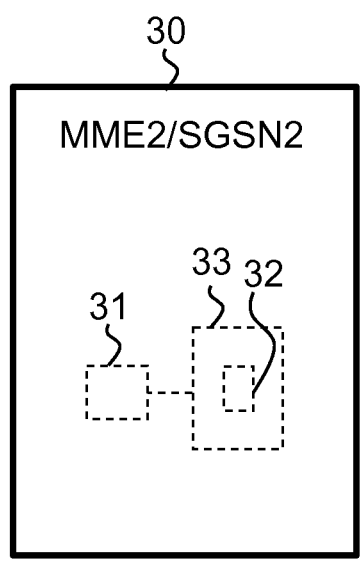

With reference to FIG. 11, the steps of the methods performed by the mobility management nodes 20, 30 according to embodiments of the invention are in practice performed by a processing unit 21, 31 embodied in the form of one or more microprocessors arranged to execute a computer program 22, 32 downloaded to a suitable storage medium 23, 33 associated with the microprocessor, such as a Random Access Memory (RAM), a Flash memory or a hard disk drive. The processing unit 21, 31 is arranged to cause the computing device 20, 30 to carry out the method according to embodiments of the present invention when the appropriate computer program 22, 32 comprising computer-executable instructions is downloaded to the storage medium 23, 33 and executed by the processing unit 21, 31. The storage medium 23, 33 may also be a computer program product comprising the computer program 22, 32. Alternatively, the computer program 22, 32 may be transferred to the storage medium 23, 33 by means of a suitable computer program product, such as a Digital Versatile Disc (DVD) or a memory stick. As a further alternative, the computer program 22, 32 may be downloaded to the storage medium 23, 33 over a network. The processing unit 21, 31 may alternatively be embodied in the form of a digital signal processor (DSP), an application specific integrated circuit (ASIC), a field-programmable gate array (FPGA), a complex programmable logic device (CPLD), etc.

Figure 12:
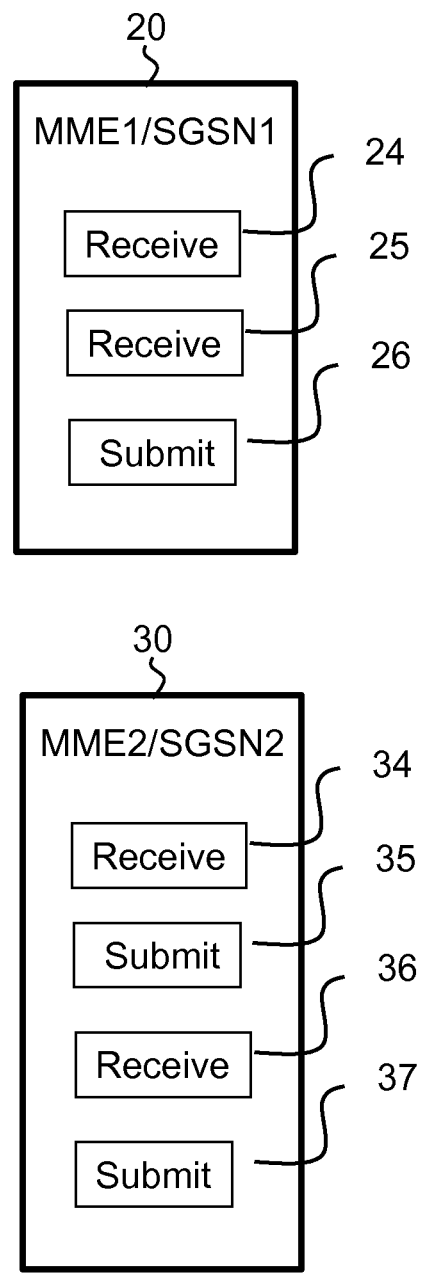
FIG. 12 illustrates further embodiment of a mobility management node of the invention.

FIG. 12 illustrates a first mobility management node 20 according to an embodiment of the invention configured to enable delivery of an MT SM to a mobile terminal. The mobility management node 20 comprises receiving means 24 adapted to receive an indication from an SMS-GMSC that the SM is to be delivered, receiving means 25 adapted to receive a notification that the mobile terminal has exited an eDRX mode before a paging occasion has occurred, and submitting means 26 adapted to submit, in response to the notification, a message indicating to the SMS-GMSC that the mobile terminal is available for delivery of the SM.

The means 24-26 may comprise a communications interface for receiving and providing information, and further a local storage for storing data, and may (in analogy with the description given in connection to FIG. 11) be implemented by a processor embodied in the form of one or more microprocessors arranged to execute a computer program downloaded to a suitable storage medium associated with the microprocessor, such as a RAM, a Flash memory or a hard disk drive.

FIG. 12 illustrates a second mobility management node 30 according to an embodiment of the invention configured to enable delivery of an MT SM to a mobile terminal. The mobility management node 30 comprises receiving means 34 adapted to receive a notification that the mobile terminal has exited an eDRX mode before a paging occasion has occurred submitting means 35 adapted to submit a context request to another mobility management node by which the mobile terminal was served before the notification was received, receiving means 36 adapted to receive, from said another mobility management node, a context response comprising an indication that the SM is to be delivered and a destination address of an SMS-GMSC delivering the SM, and submitting means 37 adapted to submit, in response to the context response, a message indicating to the SMS-GMSC that the mobile terminal is available for delivery of the SM.

The means 34-37 may comprise a communications interface for receiving and providing information, and further a local storage for storing data, and may (in analogy with the description given in connection to FIG. 11) be implemented by a processor embodied in the form of one or more microprocessors arranged to execute a computer program downloaded to a suitable storage medium associated with the microprocessor, such as a RAM, a Flash memory or a hard disk drive.

Some embodiments described above may be summarised in the following manner:

A first embodiment is directed to a method of a mobility management node of enabling delivery of a Mobile Terminating (MT) Short Message (SM), to a mobile terminal, which currently is in extended idle mode discontinuous reception (eDRX) mode.

The method comprising:
receiving an indication from a Short Message Service Gateway Mobile Switching Centre (SMS-GMSC) that the SM is to be delivered;
receiving a notification that the mobile terminal has exited the eDRX mode before a paging occasion has occurred; and
submitting, in response to the notification, a message indicating to the SMS-GMSC that the mobile terminal is available for delivery of the SM.

Said message may be submitted directly to the SMS-GMSC.

Said message may be submitted to the SMS-GMSC via a Home Subscription Server (HSS).

The message submitted to the SMS-GMSC via the HSS may further comprise an instruction to the HSS to provide the destination address of the mobility management to the SMS-GMSC.

The notification may be a Non-Access Stratum (NAS) request received from the mobile terminal.

The may further comprise: receiving, from the SMS-GMSC, the SM for delivery to the mobile terminal.

The notification may be a context request received from a serving mobility management node of the mobile terminal, the method may further comprise: submitting, to the serving mobility management node, a context response comprising an indication that the SM is to be delivered; and receiving, from the serving mobility management node, a context acknowledgement comprising a destination address of the serving mobility management node for SM delivery, wherein said submitted message further comprises the destination address of the serving mobility management node.

The notification may be a context request received from a serving mobility management node of the mobile terminal, said message being submitted to the SMS-GSMC via the serving mobility management node in a context response and further comprising a destination address of the SMS-GSMC.

The receiving of an indication from a SMS-GMSC that the SM is to be delivered may comprise:
receiving an indication of maximum retransmission time specifying how long the SMS-GMSC will store the SM if it cannot be delivered at once and capability indication indicating if the SMS-GMSC support receiving subsequent notification of mobile terminal availability for delivering the SM; and the method further comprising:
submitting an indication to the SMS-GMSC comprising a requested retransmission time indicating at which point in time the SM should be retransmitted by the SMS-GMSC and capability confirmation that the mobility management node supports the subsequent notification of mobile terminal availability for delivering the SM.

A second embodiment is directed to a method of a mobility management node of enabling delivery of a Mobile Terminating (MT) Short Message (SM) to a mobile terminal, which currently is in extended idle mode discontinuous reception (eDRX) mode.

The method comprising:
receiving a notification that the mobile terminal has exited the eDRX mode before a paging occasion has occurred;
submitting a context request to another mobility management node by which the mobile terminal was served before the notification was received;
receiving, from said another mobility management node, a context response comprising an indication that the SM is to be delivered; and
receiving, from the SMS-GMSC, the SM for delivery to the mobile terminal.

Said message may be submitted directly to the SMS-GMSC.

Said message may be submitted to the SMS-GMSC via a Home Subscription Server (HSS), the message submitted to the SMS-GMSC via the HSS further comprises an instruction to the HSS to provide the destination address of the mobility management to the SMS-GMSC.

Said message submitted further indicating a time period specifying the time up until the mobile terminal again enters the eDRX mode.

Another embodiment is directed to a mobility management node configured to enable delivery of a Mobile Terminating (MT) Short Message (SM) to a mobile terminal, which currently is in extended idle mode discontinuous reception (eDRX) mode, and which mobility management node comprises a processing unit and a memory, said memory containing instructions executable by said processing unit, whereby said mobility management node is operative to:
receive an indication from a Short Message Service Gateway Mobile Switching Centre (SMS-GMSC) that the SM is to be delivered;
receive a notification that the mobile terminal has exited the eDRX mode before a paging occasion has occurred; and
submit, in response to the notification, a message indicating to the SMS-GMSC that the mobile terminal is available for delivery of the SM.

The mobility management node may be operative to submit the message directly to the SMS-GMSC.

The mobility management node may be operative to submit the message to the SMS-GMSC via a Home Subscription Server (HSS).

The mobility management node may further be operative to include an instruction to the HSS to provide the destination address of the mobility management to the SMS-GMSC in the message submitted to the SMS-GMSC via the HSS.

The notification may be a Non-Access Stratum (NAS) request received from the mobile terminal.

The notification may be a context request received from a serving mobility management node of the mobile terminal, further being operative to:
submit, to the serving mobility management node, a context response comprising an indication that the SM is to be delivered; and
receive, from the serving mobility management node, a context acknowledgement comprising a destination address of the serving mobility management node for SM delivery, wherein said submitted message further comprises the destination address of the serving mobility management node.

The notification may be a context request received from a serving mobility management node of the mobile terminal, further being operative to submit the message to the SMS-GSMC via the serving mobility management node in a context response and further to include a destination address of the SMS-GSMC.

The mobility management node may further be operative to, when receiving an indication from a SMS-GMSC that the SM is to be delivered:
receive an indication of maximum retransmission time specifying how long the SMS-GMSC will store the SM if it cannot be delivered at once and capability indication indicating if the SMS-GMSC support receiving subsequent notification of mobile terminal availability for delivering the SM; the method further comprising: and
submit an indication to the SMS-GMSC comprising a requested retransmission time indicating at which point in time the SM should be retransmitted by the SMS-GMSC and capability confirmation that the mobility management node supports the subsequent notification of mobile terminal availability for delivering the SM.

Another embodiment is directed to a mobility management node configured to enable delivery of a Mobile Terminating (MT) Short Message (SM) to a mobile terminal which currently is in extended idle mode discontinuous reception (eDRX) mode, and which mobility management node comprises a processing unit and a memory, said memory containing instructions executable by said processing unit, whereby said mobility management node is operative to:
receive a notification that the mobile terminal has exited the eDRX mode before a paging occasion has occurred;
submit a context request to another mobility management node by which the mobile terminal was served before the notification was received;
receive, from said another mobility management node, a context response comprising an indication that the SM is to be delivered; and
receive, from the SMS-GMSC, the SM for delivery to the mobile terminal.

The mobility management node may further be operative to submit said message directly to the SMS-GMSC.

The mobility management node may further be operative to submit said message to the SMS-GMSC via a Home Subscription Server (HSS) the message submitted to the SMS-GMSC via the HSS further comprising an instruction to the HSS to provide the destination address of the mobility management to the SMS-GMSC.

The mobility management node may further be operative to include, in said submitted message, a time period specifying the time up until the mobile terminal again enters the eDRX mode.

Another embodiment is directed to a first computer program comprising computer-executable instructions for causing a device to perform steps recited in the first embodiment when the computer-executable instructions are executed on a processing unit included in the device.

Another embodiment is directed to a computer program product comprising a computer readable medium, the computer readable medium having the first computer program embodied thereon.

Another embodiment is directed to a second computer program comprising computer-executable instructions for causing a device to perform steps recited in the second embodiment summarized above when the computer-executable instructions are executed on a processing unit included in the device.

Another embodiment is directed to a computer program product comprising a computer readable medium, the computer readable medium having the second computer program embodied thereon.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a mobility management node of enabling delivery of a Mobile Terminating, MT, Short Message, SM, to a mobile terminal; comprising:
receiving an indication from a Short Message Service Gateway Mobile Switching Centre, SMS-GMSC, that the SM is to be delivered to the mobile terminal, which is currently in extended idle mode discontinuous reception, eDRX, mode;
receiving, a notification that the mobile terminal has exited the eDRX mode before a paging occasion for the mobile terminal has occurred; and
submitting directly to the SMS-GMSC, in response to the notification, a message indicating to the SMS-GMSC that the mobile terminal is available for immediate delivery of the SM.

2. The method of claim 1, the notification being a Non-Access Stratum, NAS, request received from the mobile terminal.

3. The method of claim 1, further comprising:
receiving, from the SMS-GMSC, the SM for delivery to the mobile terminal.

4. The method of claim 1, the notification being a context request received from a serving mobility management node of the mobile terminal, the method further comprising:
submitting, to the serving mobility management node, a context response comprising an indication that the SM is to be delivered; and
receiving, from the serving mobility management node, a context acknowledgement comprising a destination address of the serving mobility management node for SM delivery, wherein said submitted message further comprises the destination address of the serving mobility management node.

5. The method of claim 1, the notification being a context request received from a serving mobility management node of the mobile terminal, said message being submitted to the SMS-GSMC via the serving mobility management node in a context response and said message further comprising a destination address of the SMS-GSMC.

6. The method of claim 1, the receiving of an indication from a SMS-GMSC that the SM is to be delivered comprising:
receiving an indication of maximum retransmission time specifying how long the SMS-GMSC will store the SM if it cannot be delivered at once and capability indication indicating if the SMS-GMSC support receiving subsequent notification of mobile terminal availability for delivering the SM; the method further comprising:
submitting an indication to the SMS-GMSC comprising a requested retransmission time indicating at which point in time the SM should be retransmitted by the SMS-GMSC and capability confirmation that the mobility management node supports the subsequent notification of mobile terminal availability for delivering the SM.

7. A mobility management node configured to enable delivery of a Mobile Terminating, MT, Short Message, SM, to a mobile terminal, and which mobility management node comprises a processing unit and a memory, said memory containing instructions executable by said processing unit, whereby said mobility management node is operative to:
receive an indication from a Short Message Service Gateway Mobile Switching Centre, SMS-GMSC, that the SM is to be delivered to the mobile terminal, which is currently in extended idle mode discontinuous reception, eDRX, mode;
receive a notification that the mobile terminal has exited the eDRX mode before a paging occasion has occurred; and
submit, in response to the notification, a message indicating directly to the SMS-GMSC that the mobile terminal is available for immediate delivery of the SM.

8. The mobility management node of claim 7, the notification being a Non-Access Stratum, NAS, request received from the mobile terminal.

9. The mobility management node of claim 7, the notification being a context request received from a serving mobility management node of the mobile terminal, further being operative to:
submit, to the serving mobility management node, a context response comprising an indication that the SM is to be delivered; and
receive, from the serving mobility management node, a context acknowledgement comprising a destination address of the serving mobility management node for SM delivery, wherein said submitted message further comprises the destination address of the serving mobility management node.

10. The mobility management node of claim 7, the notification being a context request received from a serving mobility management node of the mobile terminal, further being operative to submit the message to the SMS-GSMC via the serving mobility management node in a context response and said message further to include a destination address of the SMS-GSMC.

11. The mobility management node of claim 7, further being operative to, when receiving an indication from a SMS-GMSC that the SM is to be delivered:
receive an indication of maximum retransmission time specifying how long the SMS-GMSC will store the SM if it cannot be delivered at once and capability indication indicating if the SMS-GMSC support receiving subsequent notification of mobile terminal availability for delivering the SM; the method further comprising: and
submit an indication to the SMS-GMSC comprising a requested retransmission time indicating at which point in time the SM should be retransmitted by the SMS-GMSC and capability confirmation that the mobility management node supports the subsequent notification of mobile terminal availability for delivering the SM.

* * * * *

UNITED STATES PATENT AND TRADEMARK OFFICE
CERTIFICATE OF CORRECTION

PATENT NO.        : 10,595,170 B2
APPLICATION NO.   : 15/771054
DATED             : March 17, 2020
INVENTOR(S)       : Yang et al.

It is certified that error appears in the above-identified patent and that said Letters Patent is hereby corrected as shown below:

In the Specification

Column 1, Line 16, delete "Mobile Terminating, (MT)" and insert -- Mobile Terminating (MT) --, therefor.

Column 4, Line 9, delete "Mobile Terminating, (MT)" and insert -- Mobile Terminating (MT) --, therefor.

Column 4, Line 32, delete "terminal sis" and insert -- terminal is --, therefor.

Column 6, Line 9, delete "illustrates" and insert -- illustrates a --, therefor.

Signed and Sealed this
Ninth Day of June, 2020

Andrei Iancu
*Director of the United States Patent and Trademark Office*